US007350557B2

United States Patent
Roane et al.

(10) Patent No.: US 7,350,557 B2
(45) Date of Patent: Apr. 1, 2008

(54) METHOD TO DETECT THE DISTRIBUTION OF SERVICE TEMPERATURES IN A TECHNOLOGICAL PROCESS

(75) Inventors: Cosimo Roane, Osteria Grande (IT); Gianpiero Stringhetti, Osteria Grande (IT)

(73) Assignee: Baraldi Chemgroup SRL., Osteria Grande (IT)

( * ) Notice: Subject to any disclaimer, the term of this patent is extended or adjusted under 35 U.S.C. 154(b) by 102 days.

(21) Appl. No.: 10/521,466

(22) PCT Filed: Jun. 17, 2003

(86) PCT No.: PCT/IB03/02313
§ 371 (c)(1), (2), (4) Date: Oct. 21, 2005

(87) PCT Pub. No.: WO2004/011891
PCT Pub. Date: Feb. 5, 2004

(65) Prior Publication Data
US 2006/0207743 A1    Sep. 21, 2006

(30) Foreign Application Priority Data
Jul. 25, 2002   (IT) .......................... BO02A000488

(51) Int. Cl.
*B22C 19/00* (2006.01)

(52) U.S. Cl. ..................... 164/4.1; 164/154.1

(58) Field of Classification Search ................ 164/4.1, 164/154.1, 450.2
See application file for complete search history.

(56) References Cited

U.S. PATENT DOCUMENTS

| | | | |
|---|---|---|---|
| 3,101,618 A | | 8/1963 | Hance |
| 3,160,009 A | * | 12/1964 | Carney ........................ 431/13 |
| 3,303,537 A | * | 2/1967 | Mislan ..................... 164/154.4 |
| 3,596,519 A | | 8/1971 | Blonder et al. |
| 3,933,044 A | | 1/1976 | Loper et al. |
| 6,091,444 A | | 7/2000 | McCarville et al. |
| 6,491,426 B1 | * | 12/2002 | Schonath et al. ............. 374/45 |

FOREIGN PATENT DOCUMENTS

| | | |
|---|---|---|
| EP | 1 065 484 | 1/2001 |
| FR | 2 082 719 | 12/1971 |
| JP | 408141723 A * | 6/1996 |

* cited by examiner

*Primary Examiner*—Kevin P. Kerns
(74) *Attorney, Agent, or Firm*—Oblon, Spivak, McClelland, Maier & Neustadt, P.C.

(57) ABSTRACT

A method to detect the distribution of service temperatures in a technological process that includes the automatic and programmable performance of explorative excursions done by means of an adjustable equipment (1) connected to a structure (2) provided with shutter (3) which contains a pointer device (5) and a radiations sensor (4), which after having detected the thermologic parameters of the process, sends them to computer (9) which processes, visualizes and registers them to control and regulate the distribution of the service temperatures in the course of the process.

1 Claim, 2 Drawing Sheets

METHOD TO DETECT THE DISTRIBUTION OF SERVICE TEMPERATURES IN A TECHNOLOGICAL PROCESS

FIELD OF THE ART

The present invention concerns the technology of procedures to detect the distribution of service temperatures in the course of a technological process, included in the International Classification G01 J.

STATE OF THE ART

It is known the application of sensors to detect occasionally the thermologic parameters which concern the course of technological processes.

The present invention suggests a method to detect the distribution of service temperatures in a technological process through the automatic and programmable explorative execution performed through adjustable equipment connected to a protective structure with shutter which contains a pointer device and a radiation sensor, which after having performed the detecting of thermologic parameters of process, sends them to a computer which processes, visualizes and registers them to control and regulate the distribution of the service temperatures in the course of the process.

DESCRIPTION

The invention is now described with reference to the schematic figures of the drawings attached as a not limiting example.

Figure 1:
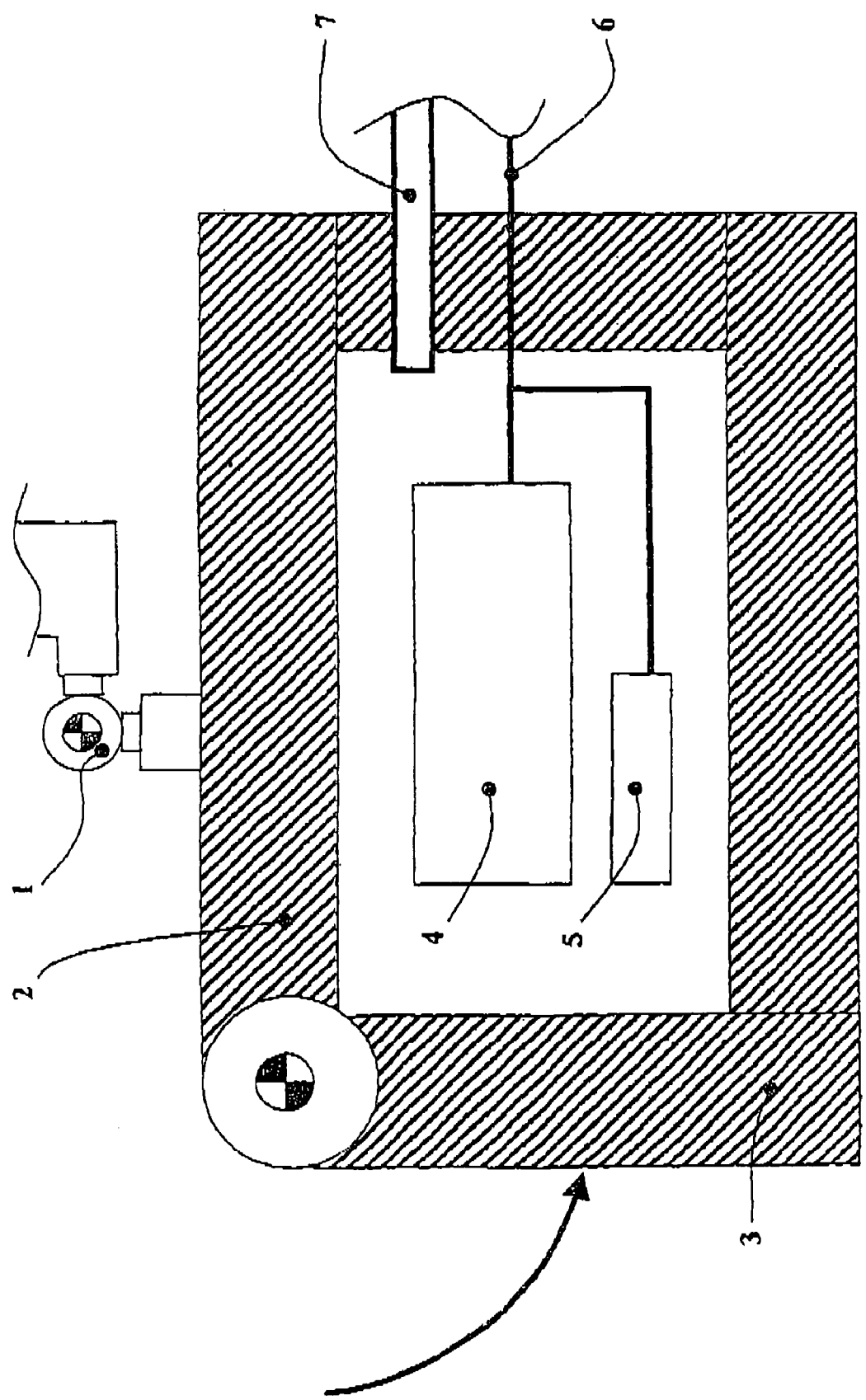
FIG. 1 represents schematically the protective structure with the shutter (3) in closed position.
Figure 2:
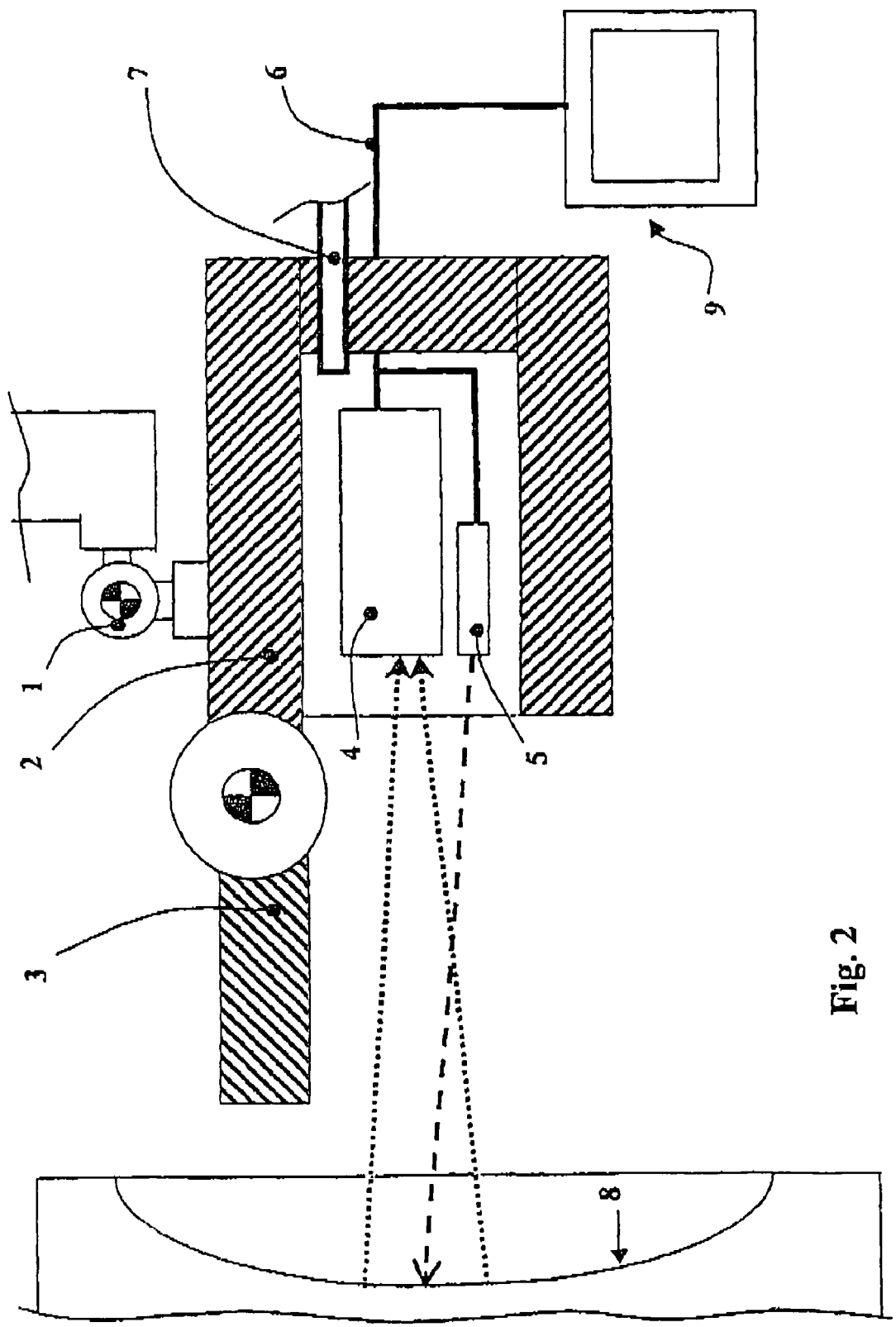
FIG. 2 represents schematically the protective structure with the shutter (3) in open position.

One can notice the presence within the protective structure of a pointer device (5) and of a radiations sensor that, after having performed the detecting of the thermologic parameters of the process, sends them to the computer equipment (9) that processes them and registers them to control and regulate the distribution of the service temperatures at the wall's surface (8).

In the figures each single detail is marked as follows:
1 indicates an adjustable equipment whose explorative excursions, programmed by the computer (9), are automatically performed;
2 is a protective structure;
3 is a shutter;
4 is a radiations sensor to detect the thermologic parameters of the process to be inspected;
5 is a pointer device to place the detecting;
6 indicates the connecting cables of the computer equipment;
7 indicates the pneumatic connection to allow the introduction of air in the protective structure;
8 is a wall at whose surface the distribution of the service temperatures should be detected;
9 indicates the computer equipment dedicated to the following functions:
  management of the program of automatic excursions of the adjustable equipment (1);
  acquisition and processing of the thermologic parameters detected by the sensor (4) and their transduction in temperature values;
  visualization and mapping of the distribution of the temperatures value upon the explored surface (8);
  control and regulation of the technological process to optimize the distribution of the service temperature.

The evidence of the figures highlights the simplicity and the reliability of the procedure which can be purposely applied in metallurgic plants, especially in die-casting and molding processes.

It should be pointed out the importance of the fact that the shutter 3, opening only when the detecting is performed, protects always the sensor 4 and the pointer 5 from the environmental disturbances of the metallurgic processes.

Furthermore, it should be pointed out that the resulting mapping of the values of the process temperatures allows to have a synoptic view of the actual conditions of the process. It also allows the simultaneous detecting of possible critical zones which require more attention in the regulation of the cooling system.

The invention could be realized with technological solutions and with structural proportioning and dimensioning which could fit different technical needs.

All the methods to detect the distribution of service temperatures in a technological process that includes, which will feature the characteristics as basically described, shown and hereinafter claimed, will be considered part of the protection sphere of the present invention.

The invention claimed is:
1. A method to detect distribution of service temperatures in die-casting or molding processes, comprising:
  automatic and programmable performance of explorative excursions by an adjustable equipment connected to a structure, which contains a pointer device and a radiation sensor which, after having detected thermologic parameters of the process, sends them to a computer which processes, visualizes, and registers them to control and regulate the distribution of the service temperatures during the process,
  wherein the structure is provided with a pneumatic connection for introduction of air into the structure and with a shutter, the pneumatic connection introducing air into the structure from a side thereof opposing the shutter; and
  opening the shutter for detecting the thermologic parameters while the radiation sensor and the pointer device are surrounded by the introduced air, which introduced air passes the pointer device and the radiation sensor from the pneumatic connection toward the opened shutter.

* * * * *

UNITED STATES PATENT AND TRADEMARK OFFICE
CERTIFICATE OF CORRECTION

PATENT NO. : 7,350,557 B2
APPLICATION NO. : 10/521466
DATED : April 1, 2008
INVENTOR(S) : Cosimo Raone et al.

It is certified that error appears in the above-identified patent and that said Letters Patent is hereby corrected as shown below:

On the title page, Item 73, the spelling of the assignee is incorrect. Item 73 should read:

--Assignee: Baraldi Lubrificanti SRL, Osteria Grande (IT)--

Signed and Sealed this

First Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,350,557 B2
APPLICATION NO. : 10/521466
DATED : April 1, 2008
INVENTOR(S) : Roane et al.

Page 1 of 1

It is certified that error appears in the above-identified patent and that said Letters Patent is hereby corrected as shown below:

On the title page, Item (75), the Inventors information is incorrect. Item (75) should read:

--(75) Inventors: Cosimo Raone, Osteria Grande (IT);
Gianpiero Stringhetti, Osteria Grande (IT)--

Signed and Sealed this

Twenty-eighth Day of October, 2008

JON W. DUDAS
*Director of the United States Patent and Trademark Office*